United States Patent
Wayne

[11] Patent Number: 5,136,276
[45] Date of Patent: Aug. 4, 1992

[54] HOOD SCOOP ASSEMBLY

[76] Inventor: Mark Wayne, 29436 Briarbank Ct., Southfield, Mich. 48034

[21] Appl. No.: 638,369

[22] Filed: Jan. 4, 1991

Related U.S. Application Data

[63] Continuation-in-part of Ser. No. 519,286, May 4, 1990, and a continuation-in-part of Ser. No. 308,810, Feb. 9, 1989, Pat. No. 4,996,442, which is a continuation-in-part of Ser. No. 201,328, May 27, 1988, abandoned, which is a continuation of Ser. No. 4,616, Jan. 20, 1987, abandoned.

[51] Int. Cl.$^5$ .............................................. B60Q 1/00
[52] U.S. Cl. ................................... 340/461; 340/459; 340/472; 307/10.1; 296/91; 362/80; 180/69.2
[58] Field of Search ............... 340/468, 461, 472, 473, 340/459; 362/80, 83.3; 180/68.3, 69.2; 296/91; 307/10.1, 9.1, 10.8

[56] References Cited

U.S. PATENT DOCUMENTS

| | | | |
|---|---|---|---|
| 2,270,587 | 1/1942 | Hall | 362/80 |
| 2,831,176 | 4/1958 | Liberto | 362/80 |
| 3,110,882 | 11/1963 | Stuerzl et al. | 340/461 |
| 3,481,119 | 12/1969 | McKinlay | 180/68.3 |
| 4,729,072 | 3/1988 | Oroza | 362/80 |
| 4,761,718 | 8/1988 | Allen | 340/472 |

Primary Examiner—Donnie L. Crosland
Attorney, Agent, or Firm—Gifford, Groh, Sprinkle, Patmore and Anderson

[57] ABSTRACT

A hood scoop assembly for selective placement upon an external surface of an automobile vehicle, a boat and the like comprises a hood scoop body portion having a front end portion, a back end portion and an underside. Removably fittable in the underside of the back end portion is a panel unit. The panel unit may be either a filler panel having an insignia or a name place thereupon, or may be a signalling and indicating box unit that is situated facing the driver to thereby visually deliver to the driver pertinent information relating to the operating condition of the vehicle. The panel unit is held either to a flange situated along the back end portion or may be disposed within a channel defined on the underside of the hood scoop body and positioned approximately at the back end portion thereof. Alternatively, the panel unit may be removably attached directly to supports provided in the "open" end of the scoop. This embodiment may be modified to provide vertical adjustment of the panel unit. The panel unit may include a heater element to clear snow or ice from the panel face.

25 Claims, 4 Drawing Sheets

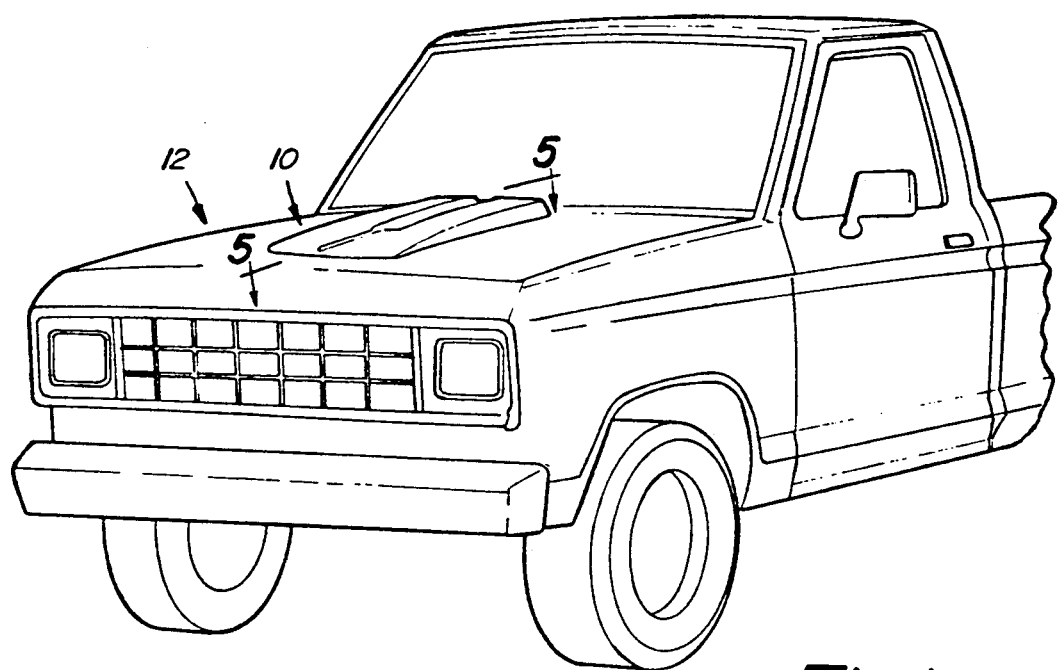
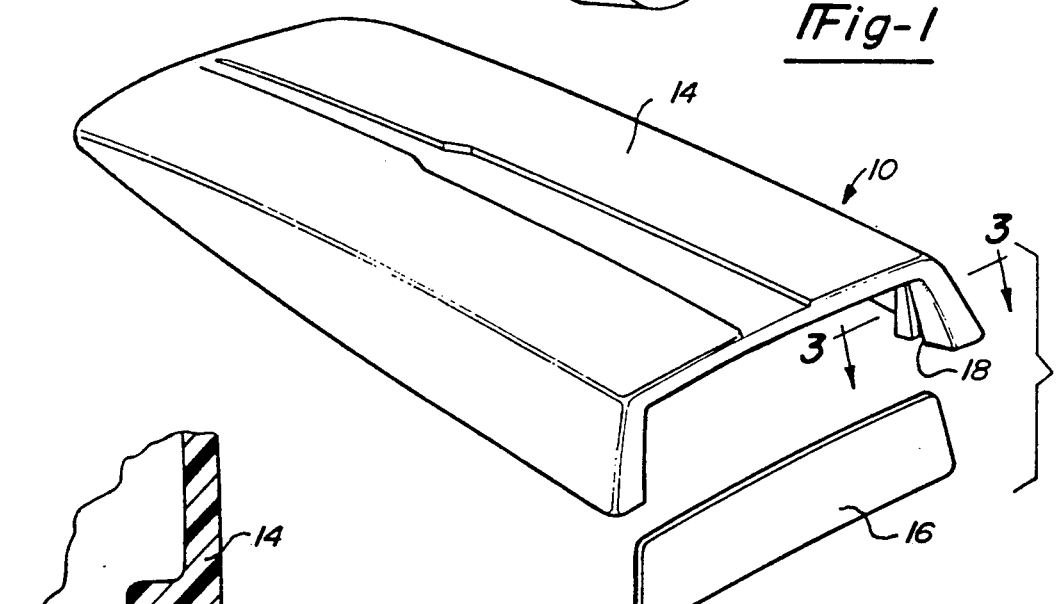
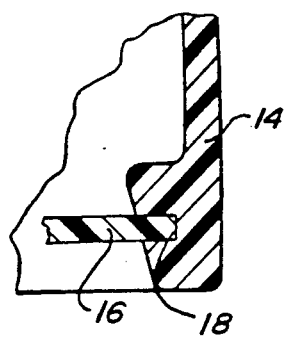
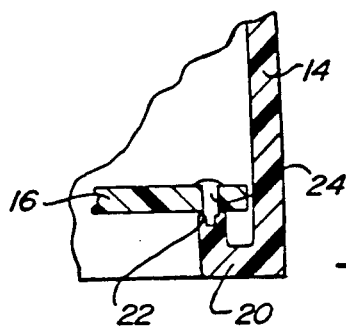

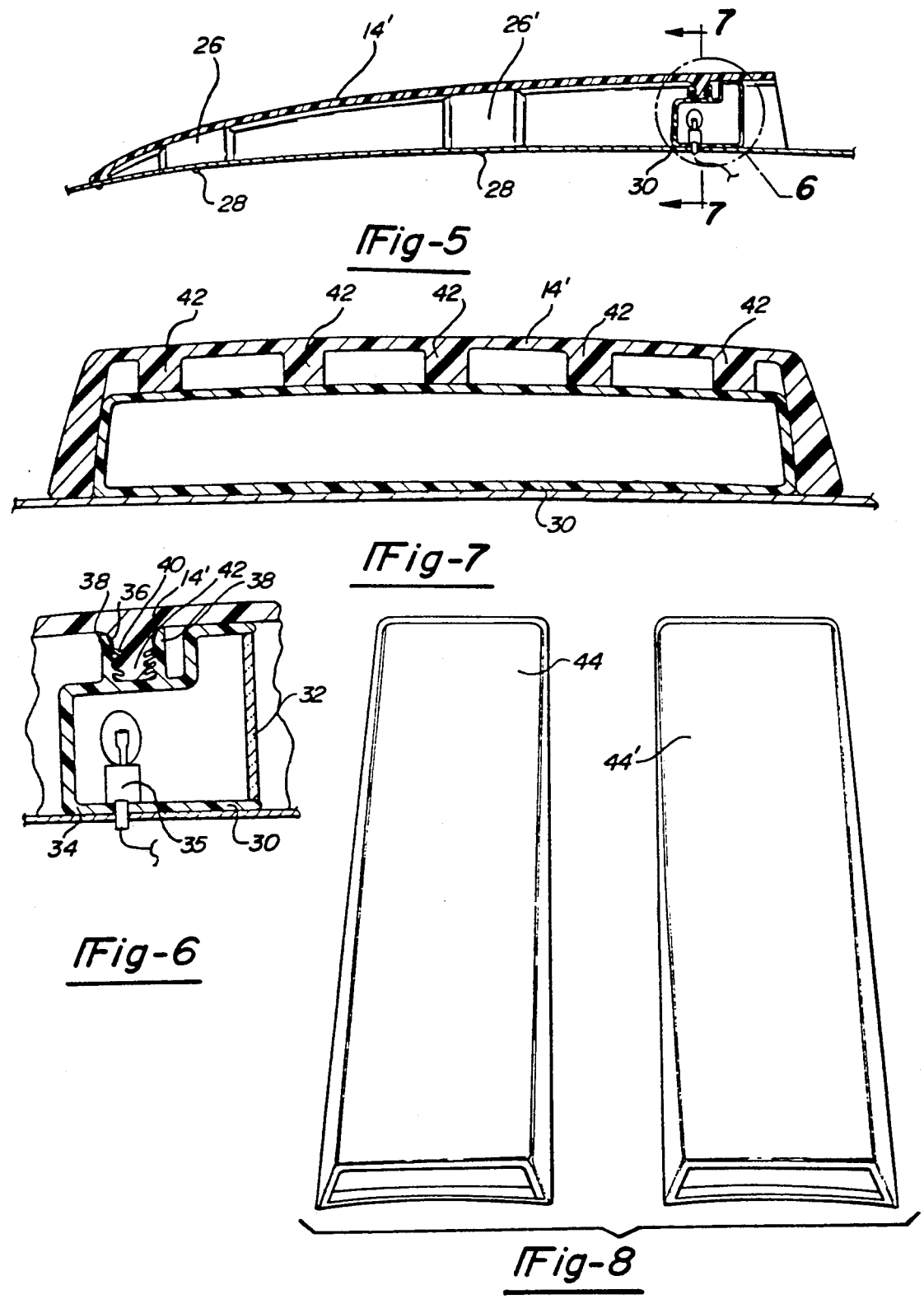

HOOD SCOOP ASSEMBLY

This application is a continuation-in-part of application Ser. No. 519,286 filed May 4, 1990 and a CIP of Ser. No. 308,810 filed Feb. 9, 1989, now U.S. Pat. No. 4,996,442, which in turn was a continuation-in-part of Ser. No. 201,328 filed May 27, 1988, abandoned, which was a continuation of Ser. No. 004,616 filed Jan. 20, 1987, abandoned.

BACKGROUND OF THE INVENTION

I. Field of the Invention

The present invention relates generally to hood scoop assemblies for automotive vehicles, boats and the like. More particularly, the present invention relates to hood scoop assemblies having removable panel units which may either be decorative units or units fitted with signalling or indicating lamps and readouts.

II. Description of the Relevant Art

Automobile design has long included adaptations loosely known as "hood scoops" ever since it was discovered that additional cooling air could be directed toward the engine compartment therethrough. Mostly hood scoops were aftermarket fixtures that were fitted strategically to the engine hoods of cars by "hot rodders", although some scoops were provided by the manufacturer as original equipment such as was supplied on the now-classic 1955-1957 Ford Thunderbird.

The use of hood scoops has not been limited in application to air capturing nd directing fixtures, however. The placement of a non-functioning hood scoop on the engine hood of an automobile adds a "racy" look to the vehicle, even though the scoop serves no practical function other than enhancing overall aesthetic appeal.

While the conventional hood scoop is forward facing with the opening of the scoop facing the direction of travel, other scoops have been reversed, with the opening facing the rear of the automobile.

To this end, no modification of the hood scoop is known that improves on the utility or appearance of the conventional hood scoop. Accordingly, the presence of the hood scoop on most automobiles offers little other than the additional streamlined appearance and attempts to overcome the limitations of known scoops have failed.

SUMMARY OF THE PRESENT INVENTION

The present invention provides a hood scoop assembly which significantly improves upon the function and appearance of hood scoops for automotive vehicles and the like. The scoop of the present invention may also be fitted to the bow cover of a boat.

The hood scoop assembly for selective placement upon an external surface of an automotive vehicle, a boat and the like according to the present invention comprises a hood scoop body portion having a front end portion, a back end portion, an underside which defines an interior, and a panel unit.

The scoop body defines a gradual taper beginning at the front end and flaring gradually toward the back end. Thus constructed, the "open" end of the scoop faces the driver of the vehicle.

A panel unit is removably fittable at the "open" end of the scoop body. The panel unit may be a plate that is either plain or includes one or more designs appearing thereupon. Alternatively, the panel unit may be a box unit having a covering plate fitted with selective masking that displays information related to the status of the vehicle such as engine speed, speed, temperature and the like. A compass may be provided for directional information, this being particularly advantageous when the scoop is adapted for use on a boat. In this latter embodiment, the box unit includes appropriate lighting and electronic readouts therein. Such hood scoops are described and claimed in my aforementioned copending patent applications.

The present invention is specifically directed to a hood scoop of the type described and including a panel unit that may be removably fitted to the "open" end of the scoop so that the panel may be readily removed for replacing bulbs, gauges, or other electrical components therein. By providing a rearwardly removable panel, these adjustments may be made with the scoop in place on the hood of the vehicle, thus eliminating the need for removing the scoop as a unit if repair is indicated. Conventional fasteners such as a pair of screws are preferably used for locking the panel in place.

As a modification of the removable panel unit discussed in the preceding paragraph, a vertically adjustable panel unit may be provided. This embodiment is directed principally at eliminating glare produced by the reflection of the sun off of the hood of the vehicle or glare that is produced directly from the sun itself.

Vertical adjustability is made possible by the top of the panel unit being pivotably engaged with a channel defined on the underside of the top of the scoop near the "open" end of the scoop. By threadingly adjusting the fasteners in or out, the panel unit is vertically adjusted to compensate for reflected and glaring light.

As a further modification of the panel unit according to the present invention, the panel may itself be heated to melt any accumulated ice or snow. This construction assures that the driver's view of the panel will not be compromised. Heating is achieved by a wire heating element being disposed within the panel when the panel material is still in its liquid of semi-liquid form during production. Alternatively, the wire heating element may be fitted to the back (inner) side of the panel.

The hood scoop body preferably includes a flange at its "open" or back end. The flange may either define a number of downward depending, cantilevered stud members to which the box unit may be fitted or may define a peripheral ridge having an interior-facing lip. The lip has a panel receiving side to which the panel is attached by fasteners.

When the box unit is selected for attachment to the cantilevered stud members, a number of barbed clips are fitted to the top side of the box unit for interfitting with the stud members. The barbed clips include a channel having two substantially parallel walls, each wall having an interior facing surface which has a plurality of barbs fixed thereto. The barbed clips lock the stud members therein.

In lieu of the attachment of the panel unit to a flange, the panel unit may be interfittable with a channel defined in the underside of the hood scoop body. The channel is positioned perpendicularly with respect to the longitudinal axis of the hood scoop body.

The body is preferably composed of a polymerized material such as a plastic or a hard rubber.

The present invention offers a more universal utility over known hood scoops in that it provides the driver with pertinent information in the preferred embodiment, thereby improving not only the aesthetic appeal of the automotive vehicle, but also improving its overall function. In the other embodiment which does not utilize the information center of the scoop, advertisement and the like may be situated on the panel unit, thereby also improving the utility of the hood scoop assembly.

Other advantages and features of the present invention will become more apparent from the following detailed description when read in conjunction with the accompanying drawing.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a perspective view illustrating the present invention in place upon the engine hood of an automotive vehicle;

FIG. 2 is a perspective view of an embodiment of the present invention showing a plate unit detached therefrom;

FIG. 3 is a view taken along line 3—3 of FIG. 2;

FIG. 4 is an alternate attachment construction of the assembly shown in FIG. 3;

FIG. 5 is a view taken along line 5—5 of FIG. 1;

FIG. 6 is a detailed view of a segment of FIG. 5 illustrating the preferred embodiment of the present invention directed at the box unit of the panel unit;

FIG. 7 is a view taken along line 6—6 of FIG. 5;

FIG. 8 is another embodiment of the present invention illustrating a pair of spaced apart hood scoop assemblies;

DETAILED DESCRIPTION OF THE PREFERRED EMBODIMENTS OF THE PRESENT INVENTION

Figure 9:
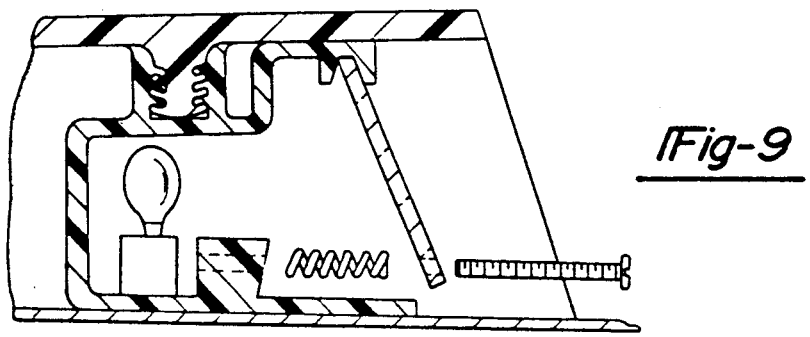
FIG. 9 is yet another embodiment of the present invention illustrating a vertically adjustable panel unit.

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a hood scoop assembly, generally indicated as 10, is illustrated in place fixed upon the engine hood of an automotive vehicle 12. As illustrated, the scoop assembly 10 is generally situated on the engine hood with the "open" end of the assembly 10 facing rearward, or in the general direction of the windshield of the vehicle 12. The vehicle 12 is illustrated as being a truck, although the scoop assembly 10 of the present invention is adaptable to other vehicles.

Referring to FIG. 2, a perspective view of a preferred embodiment of the scoop assembly 10 acccording to the present invention is illustrated. The assembly 10 comprises a scoop body 14 and a plate unit 16. The body 14 presents a tapered appearance when viewed from the side, thereby adding to the overall streamlined appearance of the vehicle to which it is fitted. According to this embodiment, the plate unit 16 comprises a substantially flat plate which is removably fitted within a channel 18 defined in the rear end portion of the body 14. The plate unit 16 may be plain in appearance or may be presented with writing or figures thereupon.

Referring to FIG. 3, a sectional view taken along line 3—3 of FIG. 2 is shown to illustrate how the plate unit 16 is slottingly fitted into the channel 18.

As an alternate method to the channel 18 of holding the late unit 16 to the scoop body 14, a flange 20 peripherally defined about the "open" end of the scoop body 14 may be provided and may include a plate attachment lip 22 for removably receiving the plate unit 16 thereupon. The plate unit 16 may be attached thereto by means of a fastener 24.

Whether the method of attachment of the plate unit 16 is the channel 18 of FIG. 3 or the flange 20 of FIG. 4, the plate unit 16 may be interchanged with other plate units of similar dimensions.

Referring to FIG. 5, an alternate embodiment of the scoop assembly 10 is shown and includes a scoop body 14'. The scoop body 14' of the embodiment described hereafter is substantially the same as the body 14, except for the construction of the "open" end.

Illustrated in the sectional view as shown in FIG. 5, a pair of supports 26, 26' may be seen, beneath which are included a plurality of scoop fasteners 28.

Near the "open" end of the scoop body 14' is situated a plate unit assembly 30. This unit assembly may be more clearly seen in FIG. 6.

With respect to FIG. 6, a detailed view of the plate unit assembly 30 is shown and includes a cover plate 32 and a housing 34. The cover plate 32 is preferably interchangable. According to the preferred embodiment of the present invention, the cover plate 32 has defined thereon selected visual information directed to the operating condition of the vehicle including such information as engine speed, road speed, oil temperature, water temperature and the like. A lighting assembly 35 is provided to convey the pertinent visual signal. Of course, although the assembly 35 is disclosed as being a conventional bulb, a light-emitting diode may be substituted therefor.

The housing 34 is interfitted to the underside of the scoop body 14' by a number of barbed channel fasteners 36. The fasteners 36 each includes a pair of parallel, spaced apart walls 38, 38' having a plurality of barbs 40 downwardly depending therefrom. As illustrated, the barbs 40 are functionally engaged to a stud member 42 depending from the underside of the body 14'.

FIG. 7 illustrates the arrangement of the stud members relative to the scoop body 14' and the housing 30. Of course, this arrangement may be modified somewhat depending upon, for example, the width of the scoop body 14'.

FIG. 8 discloses a pair of scoop bodies 44, 44' that may be preferably situated in a side-by-side relationship. In any event, the scoop bodies 44, 44' are provided with one or the other of the plate assemblies disclosed and described above.

FIG. 9 discloses a side view of an alternate embodiment of the present invention which is directed to a panel 46 that is vertically adjustable relative to the scoop body 14'. A panel assembly 30' is illustrated and is very similar to the panel assembly 30 of FIGS. 5 and 6, but includes a panel unit pivoting channel 48 and a brace member 54. The channel 48 includes a canted back wall 50 and a canted front wall 52. The cant of these walls allows for pivotable movement of the panel 46. FIG. 9 additionally discloses a spring member 56 and a bolt 58 in their preassembled positions.

Figure 10:
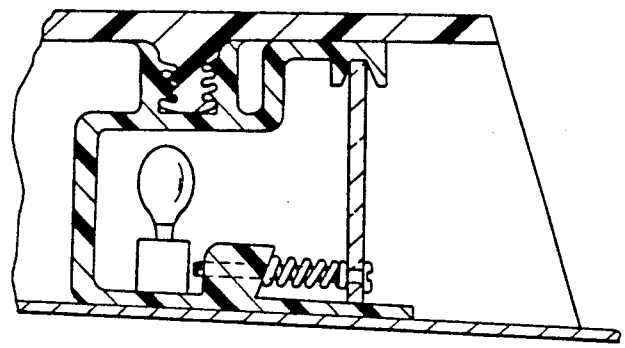
FIG. 10 is the panel unit of FIG. 9 in its perpendicular position.

Referring to FIG. 10, a view of the panel 46 in its substantially perpendicular position is illustrated. The bolt 58 is threadingly fitted into a threaded aperture (not shown) defined through the brace member 54. The spring member 56 is interfitted between the back of the panel 46 and the front of the brace member 54. Disposed in this manner, the panel 46 is firmly supported in a spaced apart manner from the base member 54.

Figure 11:
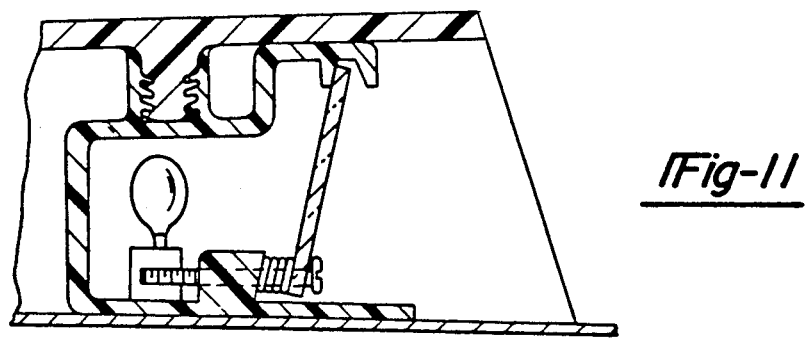
FIG. 11 is the embodiment of the panel unit of FIG. 9 in its inward-leaning position.

FIG. 11 discloses a possible alternative position for the panel 46. If the operator of the vehicle determines that the angle of the plate 46 is unsatisfactory because of glare, he may vertically adjust the position of the panel 46 as desired by threadingly turning the bolt 58 in or out depending on the desired position. As illustrated here, the bolt 58 has been turned down or inward thereby positioning the panel 46 so as to be slightly angled inward. Regardless of the positioning of the panel 46, the spring 56 provides back support for the panel 46.

Figure 12:
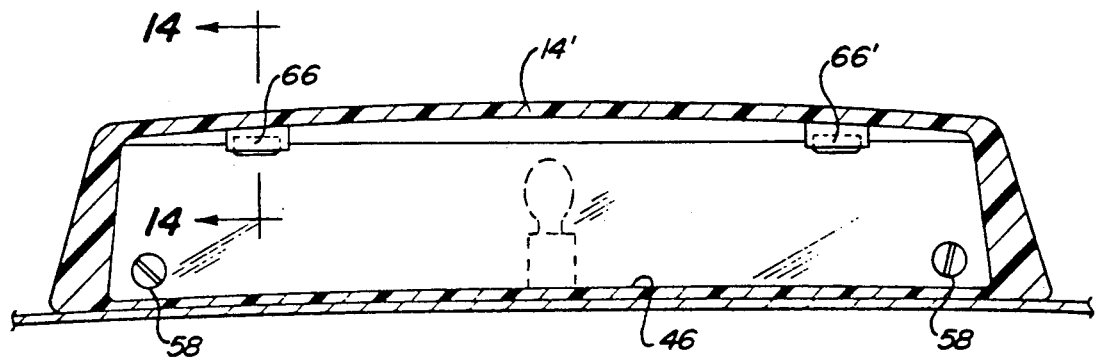
FIG. 12 is an elevated view of the "open" end of the scoop of the present invention with the panel unit in place thereon.

Referring to FIG. 12, a view taken along line 12—12 of FIG. 10 is illustrated. This view illustrates the panel 46 in place on the "open" end of the scoop body 14'. A pair of bolts 58 are provided for simply holding the panel 46 in place or for adjusting the vertical position of the panel 46 as described above.

Figure 13:
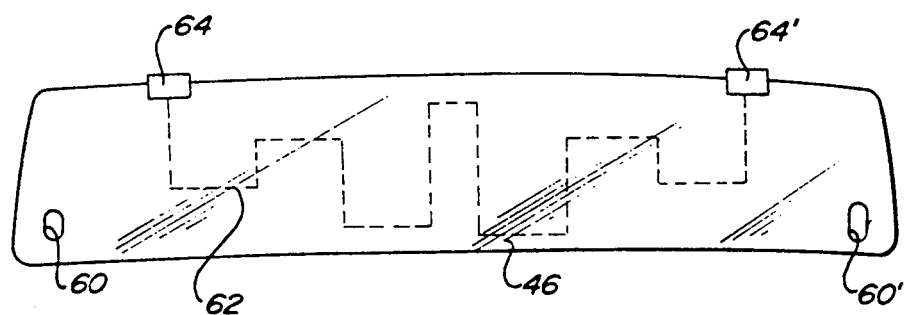
FIG. 13 is a view illustrating the panel unit.

FIG. 13 illustrates the configuration of the panel 46 having a pair of slotted holes 60, 60' which receive the bolts 58 therethrough. The elongated slots accomodate the pivoting action of the panel 46.

FIG. 13 also illustrates a heating system provided for heating the panel 46 which comprises a heating element wire 62 disposed within the panel 46. The wire 62 is provided with a pair of contact plates 64, 64' which are externally attached to the panel 46. Of course, other means of attachment may be employed.

Figure 14:
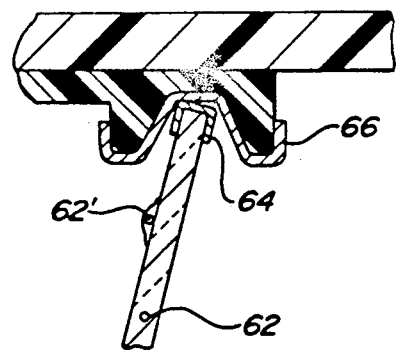
FIG. 14 is a view illustrating contact plates with the panel unit.

FIG. 14 illustrates the contact of the electrical components of the plate 46 with the pivoting channel 48. One of the contact plates 64, 64' contacts one of a pair of plate receptacles 66, 66' (illustrated in FIG. 12). As may be understood, regardless of the position of the panel 46 relative to the channel 48, contact is still achieved.

Although the wire 62 is preferably disposed within the panel 46, a wire 62' may be adhered to the back or inner side of the panel 46.

Having described my invention, however, many modifications thereto will become apparent to those skilled in the art to which it pertains without deviation from the spirit of the invention as defined by the scope of the appended claims.

I claim:

1. A hood scoop assembly a vehicle, said assembly comprising:
 a scoop body having a front end portion, a back end portion, and an underside;
 means for attaching said underside of said scoop body to an external surface of the vehicle so that said back end of said scoop body faces rearwardly on the vehicle;
 a panel,
 said panel having a front side and a back side;
 means for removably attaching said panel to said scoop body while said scoop body is attached to the external surface of the vehicle and so that said back side of said panel faces rearwardly.

2. The hood scoop assembly of claim 1 wherein said means for releasably attaching comprises one or more fasteners.

3. The hood scoop assembly of claim 1 including means for pivotably adjusting said panel.

4. The hood scoop assembly of claim 3 wherein said means for pivotably adjusting comprises a channel defined on said underside of said scoop for pivotably receiving said panel and at least one adjustable fastener.

5. The hood scoop assembly of claim 4 wherein said panel includes an upper edge, said upper edge being pivotably disposed within said channel.

6. The hood scoop assembly of claim 3 wherein said means for pivotably adjusting further comprises at least one adjustment bolt assembly.

7. The hood scoop assembly of claim 5 wherein said channel includes a first inner canted wall, a second inner canted wall and a base wall interconnecting said canted walls, said canted walls sloping away from one another.

8. The hood scoop assembly of claim 6 wherein said at least one adjustment bolt assembly comprises a bolt, a spring, and a brace member for threadably receiving said bolt.

9. The hood scoop assembly of claim 8 wherein said spring is disposed between said back side of said panel and said brace member.

10. The hood scoop assembly of claim 1 wherein said panel includes at least one elongated, slotted bolt receiving aperture defined therein.

11. A hood scoop assembly for use with a vehicle having a passenger compartment, a windshield and a hood portion extending forward of said windshield, said hood scoop assembly comprising:
 a hood scoop body having a front end, a back end, and an underside;
 a panel;
 means for attaching said panel to said back end of said scoop body; and
 means for attaching said underside of said scoop body to said hood portion so that said panel is positioned forward of the windshield.

12. The hood scoop assembly of claim 11 further including means for vertically adjusting said panel.

13. The hood scoop assembly of claim 12 wherein said hood scoop body further includes a longitudinal axis, said underside includes an inner ceiling and said means for vertically adjusting comprises a panel-receiving channel defined perpendicularly to said longitudinal axis on said inner ceiling at said back end.

14. The hood scoop assembly of claim 12 wherein said means for vertically adjusting further comprises at least one adjustment bolt assembly.

15. The hood scoop assembly of claim 13 wherein said channel includes a first inner canted wall, a second inner canted wall, and a base wall interconnecting said canted walls, said canted walls being substantially opposed to one another.

16. The hood scoop assembly of claim 14 wherein said at least one adjustment bolt assembly comprises a bolt, a spring, and a brace member for threadably receiving said bolt.

17. The hood scoop assembly of claim 16 wherein said spring is disposed between said panel and said brace member.

18. The hood scoop assembly of claim 1 wherein said panel includes at least one elongated slotted bolt-receiving aperture defined therein.

19. The hood scoop assembly of claim 11 wherein said hood scoop assembly includes at least one means of signalling disposed therein.

20. The hood scoop assembly of claim 19 wherein said means of signalling comprises a signal lamp.

21. The hood scoop assembly of claim 11 wherein said panel includes means for heating.

22. The hood scoop assembly of claim 21 wherein said means for heating comprises a wire element disposed within said panel.

23. The hood scoop assembly of claim 22 wherein said panel includes a front side and a back side, said means for heating comprising a wire element fitted to said back side of said panel.

24. A hood scoop assembly for selective placement upon the external surface of an automotive vehicle, a boat and the like, said assembly comprising:
 a scoop body having a front end portion, a back end portion, and an underside;
 a panel removably attachable to said back end portion;
 said panel having a front side and a back side;
 said panel being interchangable with other panels;
 means for releasably attaching said panel to said scoop body;
 said attaching means comprising one or more fasteners;
 means for pivotably adjusting said panel; and
 said adjusting means comprising a channel defined on said underside of said scoop for pivotably receiving said panel and at least one adjustable fastener engaging said panel to pivotably move said panel upon adjustment of said fastener.

25. A hood scoop assembly for attachment to a substantially planar surface of an automotive vehicle, a boat and the like, said hood scoop assembly comprising:
 a hood scoop body having a longitudinal axis, a pair of substantially opposing inner walls, an inner ceiling inter-connecting said inner walls, a front end and a back end;
 a panel removably attachable to said back end of said hood scoop body;
 means for supporting said removably attachable panel; and
 means for vertically adjusting said panel;
 said adjusting means comprising a panel-receiving channel defined perpendicularly to said longitudinal axis on said inner ceiling at said back end.

* * * * *